A. WICKEY.
BALING PRESS.
APPLICATION FILED MAR. 26, 1910.
977,913.
Patented Dec. 6, 1910.
2 SHEETS—SHEET 1.
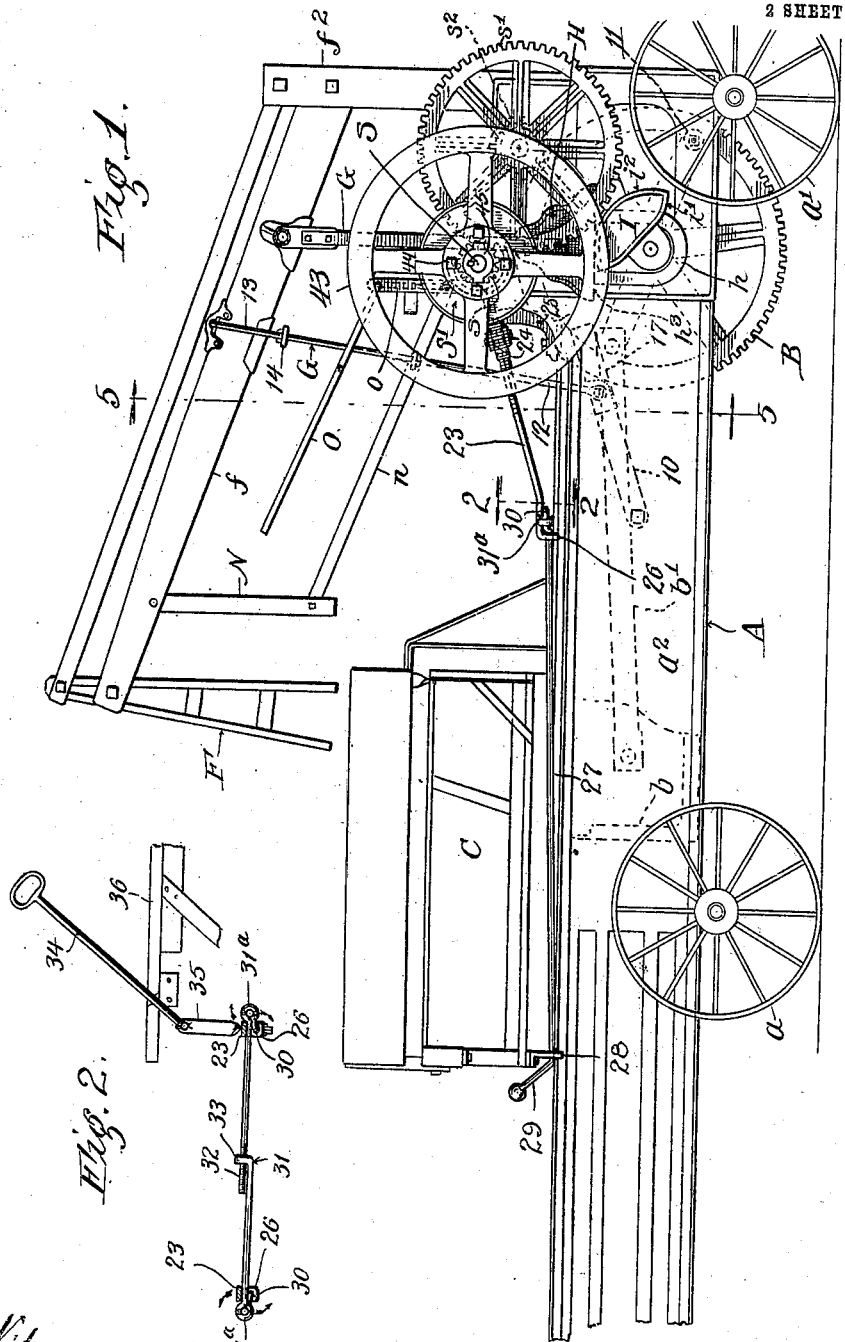
Witnesses:
Fannie F. Richards
Jean Agness
Inventor:
Andrew Wickey,
by Charles O. Shervey
his Atty.

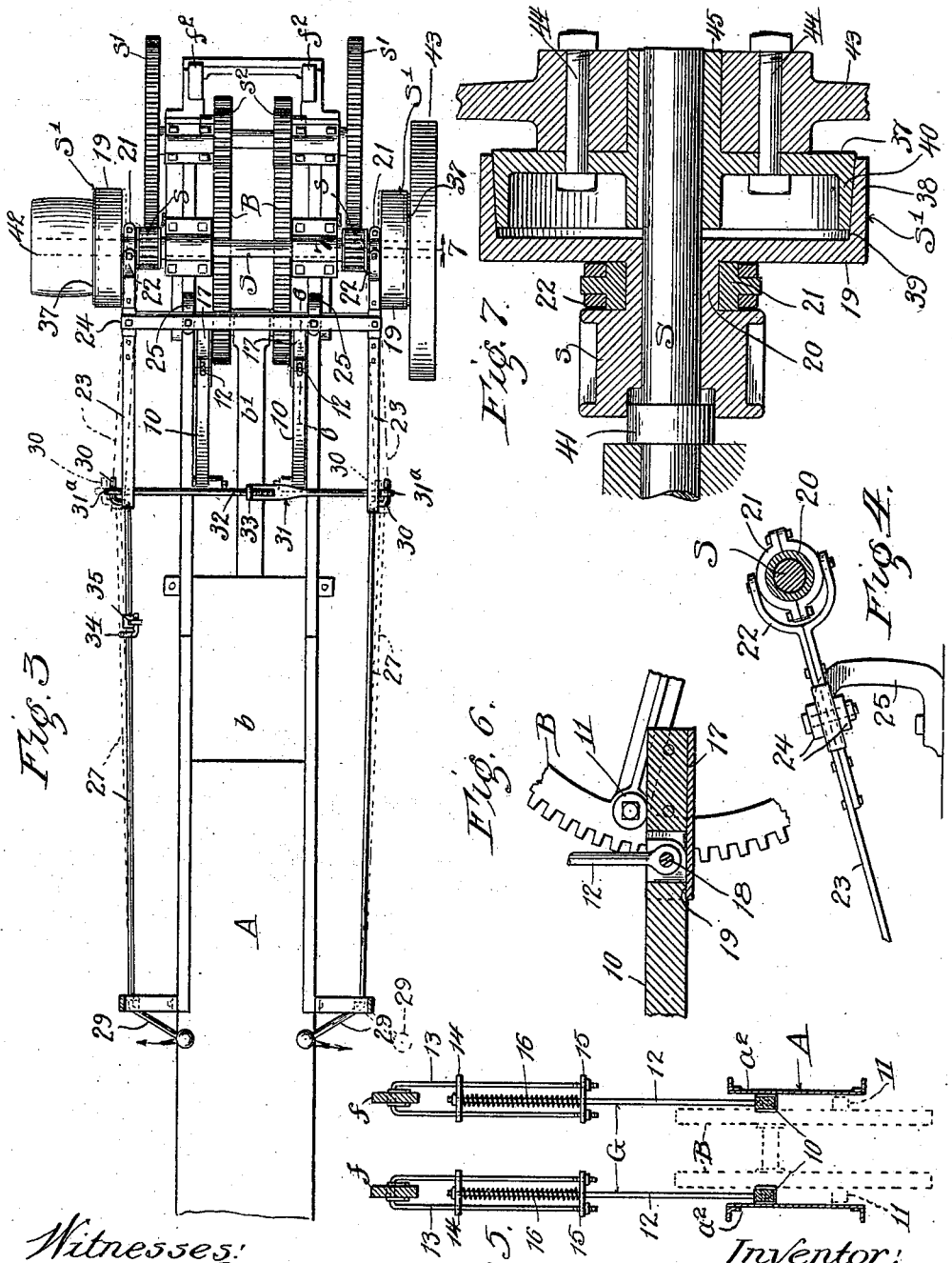

UNITED STATES PATENT OFFICE.

ANDREW WICKEY, OF EAST CHICAGO, INDIANA.

BALING-PRESS.

977,913.

Specification of Letters Patent.    Patented Dec. 6, 1910.

Application filed March 26, 1910. Serial No. 551,773.

*To all whom it may concern:*

Be it known that I, ANDREW WICKEY, a citizen of the United States, residing at East Chicago, in the county of Lake and State of Indiana, have invented new and useful Improvements in Baling-Presses, of which the following is a specification.

This invention relates to baling presses, and more particularly to that class of baling presses of which my prior Patent No. 664987, issued January 1, 1901, is an example.

This invention has reference more particularly to the starting and stopping mechanism of the press and the feeding mechanism thereof, the object being to simplify the construction, to increase the efficiency of the press and to otherwise improve upon the same.

To such ends this invention consists in certain novel features of construction, arrangement and combination of parts hereafter set forth and particularly defined in the claims.

The invention is clearly illustrated in the drawings furnished herewith, in which:

Figure 1 is a side elevation of a baling press embodying my improvements, Fig. 2 is a detail, cross section of certain parts of the clutch operating device, the line of section being taken at 2—2 in Fig. 1, Fig. 3 is a plan view of the frame, gearing and clutch operating mechanism, Fig. 4 is a side view of a clutch shifting lever, its support and the collar to which it is connected, Fig. 5 is an end view of certain mechanism for drawing down the feeder carrying arms and showing the latter and the frame of the press in cross section, the line of section being indicated at 5—5 in Fig. 1, Fig. 6 is a detail, vertical, longitudinal section of certain actuating arms, taken on the line 6—6 of Fig. 3 and Fig. 7 is a detail, vertical cross section taken on the line 7—7 of Fig. 3.

The subject matter of the present invention is illustrated in connection with a baling press like that shown and described in my prior Patent No. 664987, above referred to, and the construction and operation of the present press with the exception of the improvements, is similar thereto in most of its respects.

As in my prior patent, the press has a main frame which comprises a rectangular box A, supported on wheels $a$, $a^1$. Within said box is a plunger $b$, which is reciprocated back and forth therein by a pitman $b^1$, running to a crank pin secured upon a pair of gear wheels B, driven from a drive shaft S, by gearing comprising a pair of pinions $s$, on the drive shaft S, a pair of gears $s^1$, in mesh therewith and a pair of pinions $s^2$, connected with said gears $s^1$, and meshing with the gear wheels B. Above the box A, is a condensing mechanism C, which receives and condenses the material to be baled before it is inserted into the baling chamber, said condensing mechanism being constructed and operated as in the prior patent referred to. A feeder F, for tucking the condensed material into the baling chamber, is carried by vertically swinging arms $f$, pivoted to a pair of standards $f^2$, which are supported at the front end of the machine. A block inserter N, is carried by the arms $f$, and said block inserter is operated from a bell crank lever O, fulcrumed on a standard $o$, and connected to the block inserter N, by a link $n$.

The construction and operation of the parts thus far described is substantially the same as that of my prior patent heretofore referred to.

In the present invention the feeder carrying arms $f$, are drawn down by mechanism which receives its action from the gear wheels B. Looking at Figs. 1 and 5, two sets of connecting mechanism G, will be seen, which extend down from the feeder carrying arms $f$, to actuating arms 10. Said actuating arms 10, are fulcrumed to the inner sides of the walls $a^2$, of the box A, and extend into the paths of rollers 11, that project laterally from the gear wheels B, and operate to pull the actuating arms down from their raised positions. Each connecting mechanism G, comprises a rod 12, pivotally connected to an actuating arm 10, a U shaped stirrup 13, pivotally connected with one feeder carrying arm, and a yielding connection between the rod and stirrup comprising a cross bar 14, upon the end of the rod 12, a cross bar 15, upon the lower ends of the stirrup and a spring 16 that encircles the rod 12, and abuts against the cross bars. The rod 12, is arranged between the two members of the stirrup and slides in a hole in the cross bar 15, and the members of the stirrup slide in holes in the cross bar 14. This construction provides means for drawing down the feeder and forcing the hay from the condensing chamber into the baling chamber of the press, the springs furnishing means whereby the parts may yield, should the feeder meet with any extraordinary resistance. The actuating arms 10, are jointed as shown in Fig. 6, so as to guard against accident in case the gearing is turned backward by mistake. As shown each actuating arm 10, has an extension 17, which is hinged to the arm at 18, and abuts against the lower edge thereof as at 19. Downward pressure of the roller 11, upon the extension 17, operates to pull the arm down, but any upward pressure thereon causes the extension to swing on its pivot, permitting the roller to pass by without raising the arm.

As in my prior patent, the feeder carrying bars $f$, are raised from their lowermost position by cams I, which are fast on the stud shafts of the gears B, and engage with shoulders $h^3$, on blocks H, that are secured upon the lower ends of bars $G^1$, which are pivotally connected to the feeder carrying arms $f$. The bars $G^1$, are guided to move up and down by means of yoke shaped straps $h$, which straddle the hubs of the cams I. The cam face $i^1$, of each cam operates to raise the block H, consequently raising the bar $G^1$, and feeder carrying arm $f$, and the concentric face $i^2$, of the cam operates to hold said feeder carrying arm in its raised position until it is to be drawn down by the connecting mechanism G.

It is quite important that the operating mechanism of the press may be controlled from the rear as well as from the side of the press and in order to accomplish this I have arranged the clutch operating handles near the rear of the press, and connected the handles and clutches in a manner whereby both clutches may be thrown in or out by moving either handle. As shown in Figs. 3 and 7, each pinion $s$, of the gearing is connected to one member 19, of each clutch $S^1$, by a neck 20, and a split collar 21, is mounted upon each neck and engages with the forked end 22, of a shifting lever 23. Each lever is fulcrumed between its ends on bars 24, which are supported by brackets 25, secured to the frame of the machine and the end of each lever opposite the fork is bent down as at 26, and provided with a hole through which extends a rod 27, that runs to the rear end of the press and turns in a bracket 28, secured to the frame of the machine, said rod 27, being bent at the rear end to form a handle 29, by means of which it may be rocked. The forward end of each rod is bent to form a crank 30, one end of which extends through an eye $31^a$, in a longitudinally adjustable cross rod 31, lying underneath the levers 23. As shown one section 32, of the cross rod is threaded in an ear 33, in the other section, whereby said cross rod may be lengthened or shortened to accommodate the parts to any wear in the clutches. The arrangement of the parts just described is such that when the crank arms 30, lie substantially horizontal and extend away from each other, the clutch will be thrown in. This position is shown in full lines in the drawings where it will be seen that the ends 26, of the lever 23, are pressed toward each other by the rods 27, cranks 30, and cross rod 31. The distance between the eyes $31^a$, of the cross rod 31, being constant, rotation of either rod 27, or rather a bodily rotatory movement of such rod in the down turned end 26, the eye $31^a$, and the bracket 28, operates to swing the ends 26, of the levers 23, apart, thereby unclutching the clutches. The bodily rotatory movement of either rod 27, is effected by turning its handle 29, in the proper direction from the position shown in solid lines in the drawing.

Suppose a person on the near side of the press desires to disconnect the clutches, he raises the handle 29, on the near side and throws it over the vertical center. In case the clutch on the near side holds tighter than the one on the far side, then the lever 23, associated with the near clutch, remains stationary; the rod 27, which is being moved, rocks in the down-turned end of said lever 23; the crank 30, of said rod swings down toward the longitudinal center of the press, shifting the rod 31, toward the opposite side of the press; said rod bodily moving the crank on its far end, away from the longitudinal center of the press, said crank thereby swinging the opposite clutch lever on its fulcrum and releasing the clutch connected therewith. When said opposite lever 23, has been moved as far as it will go, the connecting rod being connected therewith can go no farther and therefore stops and the near crank 30, swings upward in the eye $31^a$, of said connecting rod, swinging its lever 23, over and disconnecting the clutch connected with said lever. In this way the down-turned ends of the levers are moved away from the longitudinal center line of the machine and while not exactly simultaneous, yet so close together that the difference in time is almost imperceptible. Usually, however, both clutches are tight, and if the same rod 27, is turned to disconnect the clutches, the turning of its crank in the down-turned end 26, of the lever 23, and eye $31^a$, of the connecting rod 31, operates to swing the end of the lever 23, over and away from the longitudinal center line of the machine and to simultaneously shift the connecting rod 31, over, thereby pushing the crank 30, on its far end, and thus shifting the end of the lever 23, on said far end of the press, away from the longitudinal center. The arrows in Fig. 2 indicate generally the direction taken by either crank 30, when its rod is being turned to shift both clutch levers.

When the handles 29, occupy the positions shown in full lines, the cranks 30, are swung by their dead centers consequently locking the parts together, with the clutches thrown in, until either handle is swung back. In this way an attendant may actuate both clutches from either side of the machine to start or stop the operating devices. A third handle 34, is shown in Fig. 2, which is connected to an arm 35, fast to one of the rods 27, whereby the clutches may be thrown by an attendant standing upon a raised platform 36.

The clutch itself is novel and comprises the clutch member 19, heretofore referred to, which is loose upon the shaft, and the inner clutch member 37, which is keyed or otherwise rigidly fastened to the shaft. The clutch member 19, has an annular flange 38, which is formed with a tapered inner bearing face 39, and the clutch member 37, has an annular flange 40, which fits the tapered face 39, of the flange 38. The shaft on which the clutch is mounted, is prevented from endwise movement in its bearings by means of shoulders 41, formed on the shaft and the clutch is "thrown in" by shifting the member 19, over until the bearing faces of the flanges meet. The belt pulley 42, is secured to the member 37, of one clutch and the fly wheel 43, to the member 37 of the other clutch. This is accomplished by means of bolts and nuts 44, that connect the webs of the clutch members 37, with the hubs of the fly wheel and pulley, respectively. The hubs of the fly wheel and pulley fit over hubs 45, that project out from the members 37, of the clutches and act to properly position the wheel and the pulley upon the clutches.

The operation of the machine is substantially like that of the operation of the press of my prior patent heretofore referred to, with the exception of the feeder operating mechanism and clutch shifting mechanism. The operating devices are timed so that while the plunger is retracted, the rollers 11, engage with the actuating arms 10, and draw down the feeder through the instrumentality of the connecting mechanism G, and the feeder carrying arms thereby causing the feeder to tuck the material into the baling chamber. After the rollers pass by said actuating arms 10, the bearing faces $i^1$ of the cams I, engage with the shoulders of the blocks H, raise said blocks, the bars $G^1$, and the feeder carrying arm $f$, consequently raising the feeder out of the press, after which the plunger moves forward to press the material in the baling chamber.

To start the press, the operator throws the handles 29, into the position shown in solid lines, thereby rocking the rods 27, in the eyes 31ª, as fulcrums, swinging the clutch levers 23, on their fulcrums, throwing the clutch members 19, into engagement with the clutch members of the clutch 37. To stop the press, either handle 29, or the handle 34, is thrown back. In this way any one of the three handles may be employed to control both clutches in the operation of the machine.

I am aware that various alterations and modifications of this device are possible without departing from the spirit of my invention, and I do not therefore desire to limit myself to the exact form of construction shown and described.

I claim as new and desire to secure by Letters Patent:

1. In a baling press, the combination with a frame, standards rising therefrom and a feeder carrying arm fulcrumed on said standards, of a connecting rod connected with and extending down from said arm, an actuating arm fulcrumed upon the frame of the press and being secured to said connecting rod and a rotating element having a laterally projecting roller arranged to engage directly with the actuating arm to pull the same down.

2. In a baling press, the combination with a frame, standards rising therefrom and a feeder carrying arm fulcrumed on said standards, of a pair of connecting rods connected to and extending down from said arm, each connecting rod comprising two slidably connected sections arranged with a spring between them for permitting a limited amount of movement of one section upon the other, a pair of actuating arms fulcrumed on the frame of the press and being connected at points between their ends to said connecting rods and a pair of rotating gear wheels having laterally projecting rollers arranged to engage said actuating arms at points beyond their connections with the connecting rods and arranged to pull the same down.

3. In a baling press, the combination with a feeder carrying arm, of a longitudinally extensible connecting rod projecting down from said arm, an actuating arm secured to the lower end of said connecting rod, an extension fulcrumed to said arm and arranged to swing upwardly with relation thereto from its normal position, but having means for preventing downward movement from said normal position and a rotating element having a roller arranged to engage with said extension on the actuating arm to pull said arm downward.

4. In a baling press having a driving shaft, two sets of gearing and clutches between said shaft and one member of each set of gearing, the combination with a pair of clutch shifting levers extending longitudinally of the press body and fulcrumed between their ends upon said press body, of rods lying along the opposite sides of the press body and extending toward the rear end of the press from said clutch shifting levers and having handles upon their rear ends, and having cranks upon their forward ends which are journaled in the adjacent ends of the clutch shifting levers and a cross bar connecting the ends of said cranks, whereby both clutch shifting levers may be operated simultaneously from either side of the press.

5. In a baling press, having a driving shaft, two sets of gearing and a pair of clutches interposed between the shaft and one member of each set of gearing, the combination with a pair of clutch operating levers extending longitudinally of the machine, of rods lying along both sides of the press and extending from said clutch operating levers to the rear of the press, and having handles at said rear end, and having cranks at their forward ends arranged to actuate the clutch operating levers and a longitudinally adjustable connecting rod connecting the ends of said cranks, whereby both clutch shifting levers may be operated simultaneously from either side of the press.

In testimony whereof, I have hereunto set my hand at East Chicago, Lake county, Indiana, this 23d day of March 1910.

ANDREW WICKEY.

Witnesses:
CHARLES O. SHERVEY,
MINNIE E. PETERSON.